(12) United States Patent
Gong et al.

(10) Patent No.: US 8,206,655 B2
(45) Date of Patent: Jun. 26, 2012

(54) SULFUR DIOXIDE GENERATOR WITH AQUEOUS GAS MIXER/AERATOR

(75) Inventors: Terry Gong, Bakersfield, CA (US); John Harmon, Bakersfield, CA (US)

(73) Assignee: Earth Renaissance Technologies, LLC, Salt Lake City, UT (US)

( * ) Notice: Subject to any disclaimer, the term of this patent is extended or adjusted under 35 U.S.C. 154(b) by 167 days.

(21) Appl. No.: 12/803,310

(22) Filed: Jun. 24, 2010

(65) Prior Publication Data

US 2011/0318239 A1   Dec. 29, 2011

(51) Int. Cl.
 *C01B 17/48* (2006.01)
 *B01J 19/00* (2006.01)
 *B01J 8/00* (2006.01)
 *C01B 17/00* (2006.01)

(52) U.S. Cl. ........ 422/160; 422/129; 422/187; 423/511; 423/512.1

(58) Field of Classification Search ................... 422/129, 422/160, 161, 187; 423/511, 512.1, 521, 423/522
See application file for complete search history.

(56) References Cited

U.S. PATENT DOCUMENTS

| | | |
|---|---|---|
| 1,450,677 A | 4/1923 | Chickering |
| 1,545,381 A | 7/1925 | Zeisberg |
| 1,638,992 A | 8/1927 | Gillett |
| 3,226,201 A | 12/1965 | Harmon |
| 3,337,989 A | 8/1967 | Harmon |
| 3,627,134 A | 12/1971 | Mattson |
| 3,723,068 A | 3/1973 | McIllroy |
| 3,907,510 A | 9/1975 | Collins |
| 4,039,289 A | 8/1977 | Collins et al. |
| 4,526,771 A | 7/1985 | Forbush et al. |
| 4,966,757 A | 10/1990 | Lewis et al. |
| 5,204,082 A | 4/1993 | Schendel |
| 6,464,885 B1 | 10/2002 | Smith |
| 2008/0044342 A1* | 2/2008 | Muller et al. ................. 423/522 |

* cited by examiner

*Primary Examiner* — Walter D Griffin
*Assistant Examiner* — Natasha Young
(74) *Attorney, Agent, or Firm* — Marcus G. Theodore

(57) ABSTRACT

An apparatus for burning sulfur to produce sulfur dioxide, which sulfur dioxide is associated with a multi-channel gas valve associated with other gas sources to selectively be blended each into water by a combination mixer/aerator to aerate water in one monde, admix sulfur dioxide with water to form sulfurous acid in another mode, and stir and mix water without gases in a third mode.

14 Claims, 7 Drawing Sheets

Aeration

FIG. 2

SULFUR DIOXIDE GENERATOR WITH AQUEOUS GAS MIXER/AERATOR

BACKGROUND OF THE INVENTION

1. Field

This invention is directed to an apparatus for burning sulfur to sulfur dioxide, which sulfur dioxide is associated with a multi-channel gas valve associated with multiple gas sources to selectively blended them into water with a combination mixer/aerator to aerate water in one monde, admix sulfur dioxide with water to form sulfurous acid in another mode, and stir and mix water without gases, in another mode.

2. State of the Art

Various sulfur burning sulfur dioxide generators are known and used for various purposes, such as that described in Harmon, U.S. Pat. No. 3,226,201 issued Dec. 28, 1965 entitled "Apparatus for Treating Irrigation Water" burning sulfur to produce sulfur dioxide for injection into irrigation water for pH adjustment. Harmon, U.S. Pat. No. 3,337,989 issued Aug. 29, 1967 entitled "Process of Treating Soil Containing Carbonates" was directed toward burning sulfur to produce sulfur dioxide for injection into water to produce sulfurous acid for soil treatment. Mattson, U.S. Pat. No. 3,627,134 issued Dec. 14, 1971 entitled "Water Treatment Device" uses a two-zoned tank to produce sulfur dioxide for injection into water to produce a concentrated solution of sulfurous acid, which is then used to acidify irrigation water. Collins, U.S. Pat. No. 3,907,510 issued Sep. 23, 1975 entitled "System for Burning Sulfur and Absorbing Sulfur Dioxide in Water" burns sulfur to produce sulfur dioxide, which rises through packing through a countercurrent stream of water to produce sulfurous acid for agricultural applications. Collins et al., U.S. Pat. No. 4,039,289 issued Aug. 2, 1977 entitled "Sulphur-Burning and Gaseous Products Absorption System and Components Therefore" burns sulfur to produce sulfur dioxide, which is directed to pass through an absorption tower with pre-cooling means to further improve absorption tower efficiency via temperature regulation sensors increasing the flow of water through the countercurrent tower.

Lewis et al., U.S. Pat. No. 4,966,757 issued Oct. 30, 1990 entitled "Sulfur Dioxide Generator" employs dual burn chambers to produce sulfur dioxide directed through a countercurrent absorption tower under negative pressure. Forbush et al., U.S. Pat. No. 4,526,771 issued Jul. 2, 1985 entitled "Sulfurous Acid Generator" employs dual burn chambers to produce sulfur dioxide, which is directed through an absorption tower to produce sulfurous acid. These devices are limited in the maximum burning rate of sulfur per hour to approximately 7 pounds of sulfur per hour per square foot of burning surface. The Sulfurous Acid Generator of U.S. Pat. No. 4,526,771 utilizes a positive pressure air feed system which significantly increased the sulfur burn rate and efficiency, but did not provide sufficient ability to provide varying strengths of acids required by farmers for differing agricultural applications. Also, because of the positive air pressure oxygen feed system, this '771 sulfurous acid generator was subject to sulfur dioxide leaks through breaks in seals, and machine welds which could jeopardize the operator. The heat produced from burning sulfur was not recaptured, but dissipated into the atmosphere.

Jackson, U.S. Pat. No. 6,689,326 issued Feb. 10, 2004 entitled "Method and Apparatus for Introducing Sulphur Dioxide into Aqueous Solutions" is a sulfurous acid generator, which injects sulfur dioxide gas into a pressurized fluid line of aqueous solution to form sulfurous acid, without employing a countercurrent absorption tower.

Cited for general interest is Gillett, U.S. Pat. No. 1,638,992 issued Mar. 28, 1925 entitled "Sulphur Burner", which burns sulfur to generate heat to be used to produce steam. Zeisberg, U.S. Pat. No. 1,545,381 issued Jul. 7, 1925 entitled "Burning Sulphur and Recovery of Heat Generated" is another device for burning sulfur to generate and recover heat, while producing sulfur dioxide for process use. Chickering, U.S. Pat. No. 1,450,677 issued Apr. 3, 1923 entitled "Sulphur Burner" is another device for burning sulfur high in ash content to produce sulfur dioxide. Schendel, U.S. Pat. No. 5,204,082 issued Apr. 20, 1993 entitled "Sulfur Dioxide Generation by Submerged Combustion and Reduced Thermal Cycling by Use of a Hot Recycle of Sulfur" is a method producing high purity sulfur dioxide by submerged combustion. The Sulfur is combusted in a first liquid pool with an oxygen containing gas and the vapor effluent is removed and cooled in a first cooling zone at a temperature above 600 degrees F. to separate the liquid sulfur from the vapor for re-burning. McIlroy et al, U.S. Pat. No. 3,723,068 issued Mar. 27, 1973 discloses an apparatus for the preparation of sulfur dioxide whereby the sulfur is burned within a cyclone furnace supplied with a closely controlled amount of excess air to minimize sulfur trioxide formation. The combustion product gases are passed through a water spray tower for cooling and to remove any sulfur trioxide present. Smith, U.S. Pat. No. 6,464,885 issued Oct. 15, 2002 entitled "Water Treatment Systems" discloses a system for processing water by adding an additive to a stream of pressured fluid containing chlorine to which a supply of dechlorinating additive (such as sulfur dioxide) is injected for chlorine removal.

The present invention provides an improved sulfur dioxide generator in combination with an aerator/mixer with multi-functionality, providing precision controlled fine bubble aeration and impeller mixing capable of drawing in additional gases such as sulfur dioxide to provide the varying gas concentrations required for water treatment of open ponds and enclosed tanks, as more fully described below.

SUMMARY OF THE INVENTION

The present invention comprises a sulfur hopper, a cyclonic sulfur-burn chamber structured to hold a pool of molten sulfur, which when combined with air produces sulfur dioxide. An $SO_2$ conduit transmits the sulfur dioxide from the sulfur-burn chamber to a multi-channel gas valve selectively feeding gases to pass through a combination aerator/mixer with propeller mounted beyond the aerator, both positioned within water to be treated with gases. The combination aerator/mixer contains at least one gas channel in communication with the aerator, which injects fine bubbles of gases into the water in response to a drop in pressure (Bernoulli effect) caused by a rotating mixing propeller located proximate the aerator. Preferably a variable speed motor rotates the propeller at different speeds to create differing negative pressures near the aerator. These negative pressure drops reduce the pressure within the aerator/mixer gas channel, which the multi-channel valve selectively applies to the gas sources to draw in more gases in response to the speed of the propeller to increase their concentrations within the treated water.

The multi-channel valve may be associated with a number of different gas sources in addition to sulfur dioxide, such as oxygen (ambient air), or chlorine for admixing into water for various treatments. The multi-channel valve includes a gas shut-off position when the propeller is only used for mixing and circulation.

The sulfur-burn chamber comprises a cyclonic negative pressure enclosure adapted to hold a pool of molten sulfur therein within its bottom having a sulfur inlet at a first lower elevation. The sulfur-burn chamber has an oxygen-containing tangential air inlet at a second, relatively higher elevation to inject air in a cyclonic motion above the pool of molten sulfur, and a sulfur dioxide gas outlet at a third relatively higher elevation to release sulfur dioxide. The sulfur-burning chamber is structured so that as more air enters, the burn rate increases to melt more sulfur and the cyclonic gases rotate faster and faster above the pool of molten sulfur until the liquid sulfur is blown outwardly and starts climbing the sidewalls of the sulfur-burning chamber exposing more liquid surface area to generate more sulfur dioxide. Thus the production of sulfur dioxide is directly proportional to surface area of the pool of molten sulfur and the amount of air drawn into the burn chamber by varying negative pressure within the system.

The sulfur hopper is closely coupled to the sulfur-burn chamber so that the heat of the burning sulfur melts the solid sulfur in the lower segment of the sulfur hopper to insure that molten sulfur is continuously provided to the sulfur pool. This close coupling can be accomplished with a short conduit between the sulfur hopper and the sulfur inlet of the sulfur-burn chamber, where the conduit has a cross-sectional area sufficient to allow enough sulfur to pass into the sulfur-burn chamber from the feed tank at sufficient flow to sustain the maximum burn rate, but sized to provide sufficient sulfur flow resistance to prevent unmelted sulfur from entirely filling the burn chamber.

The gas generated in the sulfur-burn chamber contains sulfur, sulfur dioxide and unreacted oxygen. The sulfur-burn chamber is sized to provide sufficient residence time for the cyclonic gases to combust the sulfur to insure that substantially all of the sulfur is converted to sulfur dioxide. Optional means may be associated with the tangential air inlet to regulate the air flow drawn in response to the negative pressure created by the spinning mixing propeller. Thus, to increase the amount of sulfur dioxide to be admixed in water, the speed of the mixing propeller is simply adjusted to provide the required pH of the water. Increasing the negative pressure within the $SO_2$ conduit increases the amount of air drawn into the sulfur-burn chamber to produce more sulfur dioxide for admixing with water.

A pH sensor is associated with the treated water, which electro-mechanically interpreted by a controller to adjust the speed of the motor driving the propeller to vary the air flow through the tangential air inlet. As higher acid pH is required to be produced, speed of the propeller is increased to draw in more air into the sulfur-burn chamber. Conversely, as weaker acid pH is required, the speed of the propeller is decreased to draw less air into the sulfur-burn chamber.

Thus, the improved negative air fed sulfurous acid generator and aqueous gas mixer and aerator not only produces a wide range of strengths of sulfurous acid for irrigation, wastewater treatment, and other applications, it also prevents accidental leakage and exposure of the operator to SO2 gas. It further allows the admixing of other gases into waters as part of a comprehensive water treatment cycle.

DESCRIPTION OF THE DRAWINGS

Figure 2:
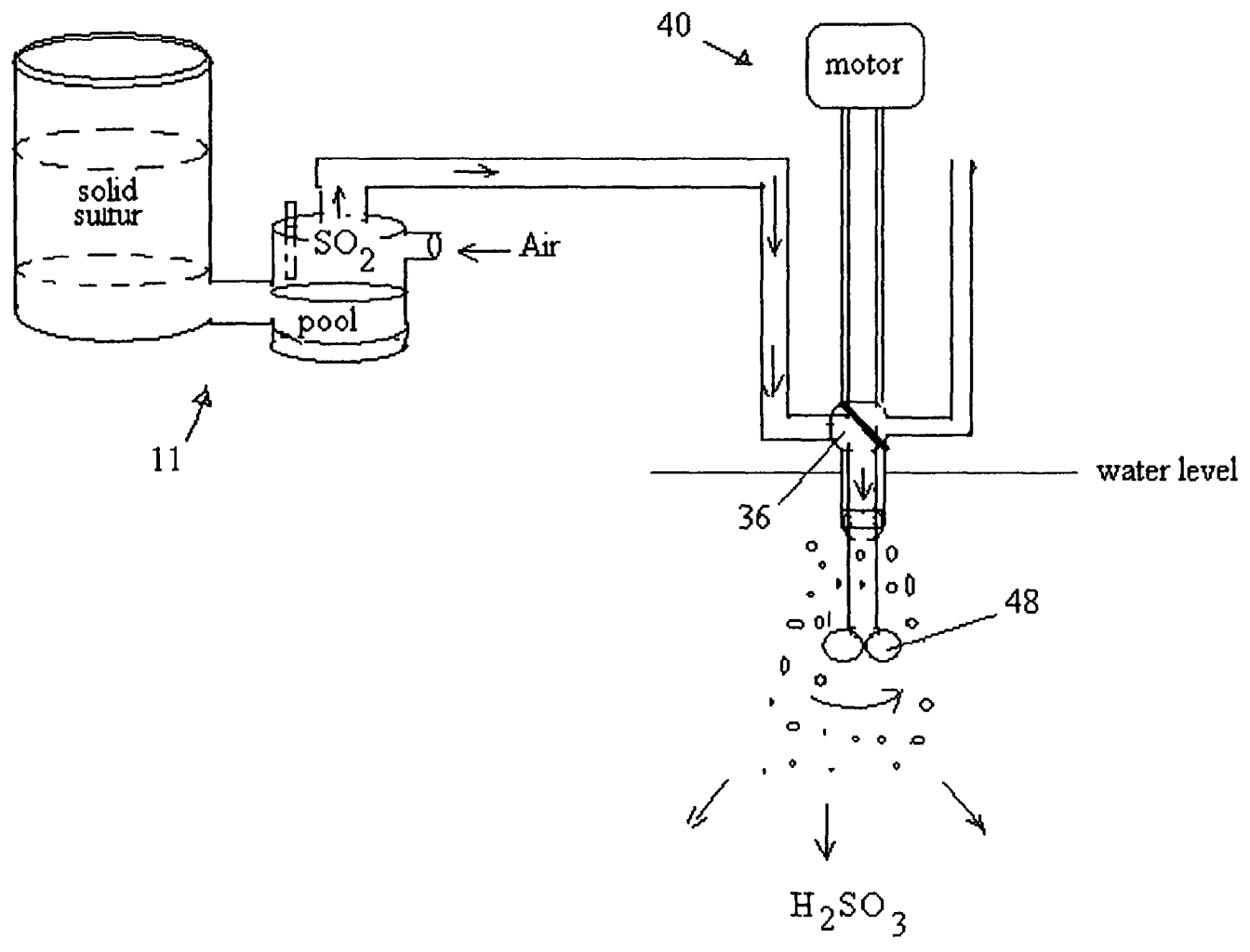

FIG. 2 is a perspective view of the invention acidifying water.

DESCRIPTION OF THE ILLUSTRATED EMBODIMENTS

Figure 1:
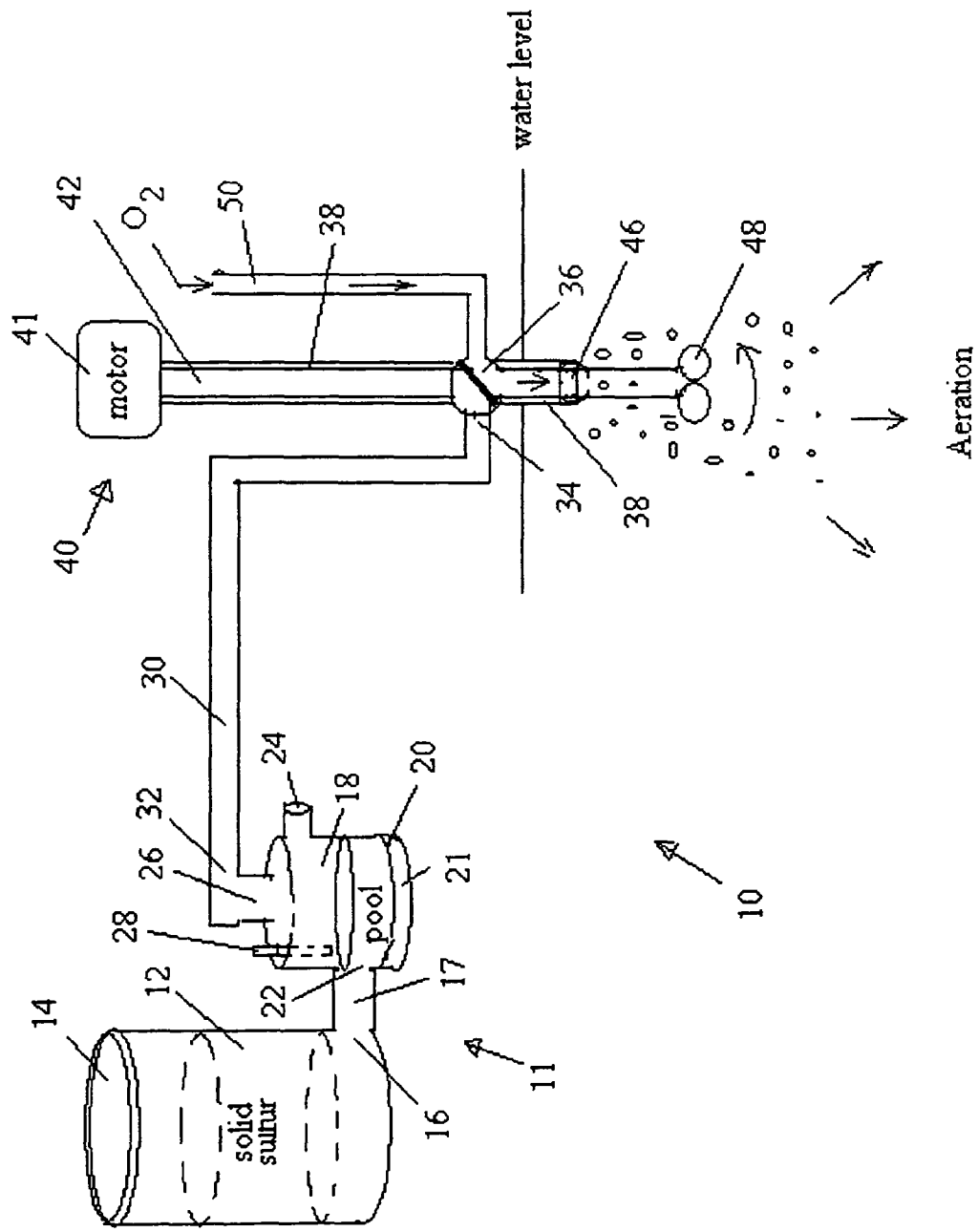
FIG. 1 is a perspective view of the invention aerating water.
Figure 3:
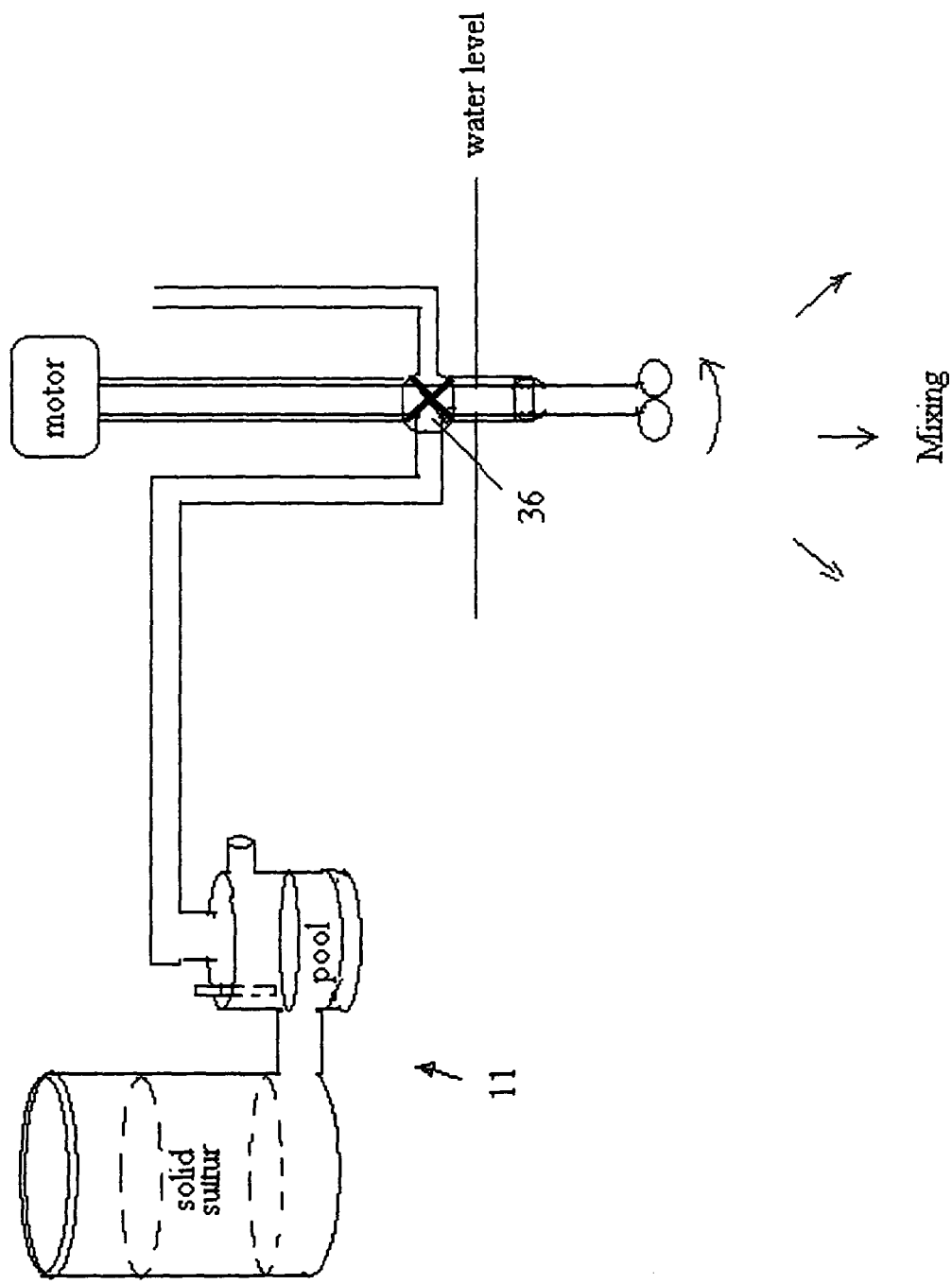
FIG. 3 is a perspective view of the invention circulating and mixing water.
Figure 5:
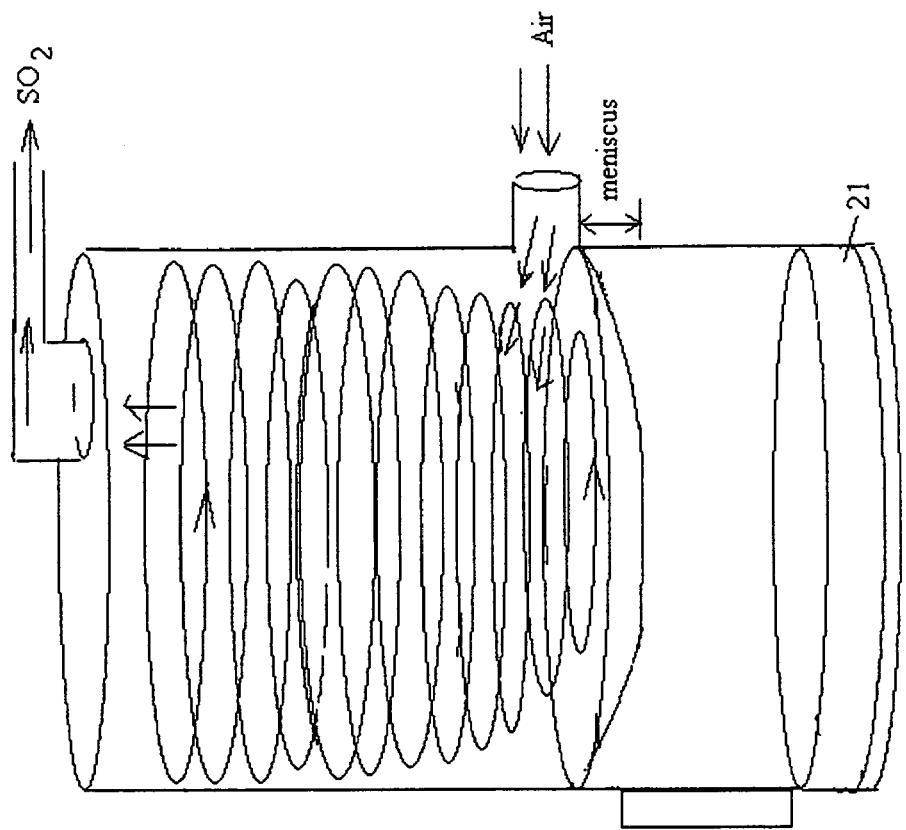
FIG. 5 is a perspective view of the sulfur-burn chamber of FIG. 4 showing the change in the pool of sulfur with the addition of a higher rate of air flow.
Figure 4:
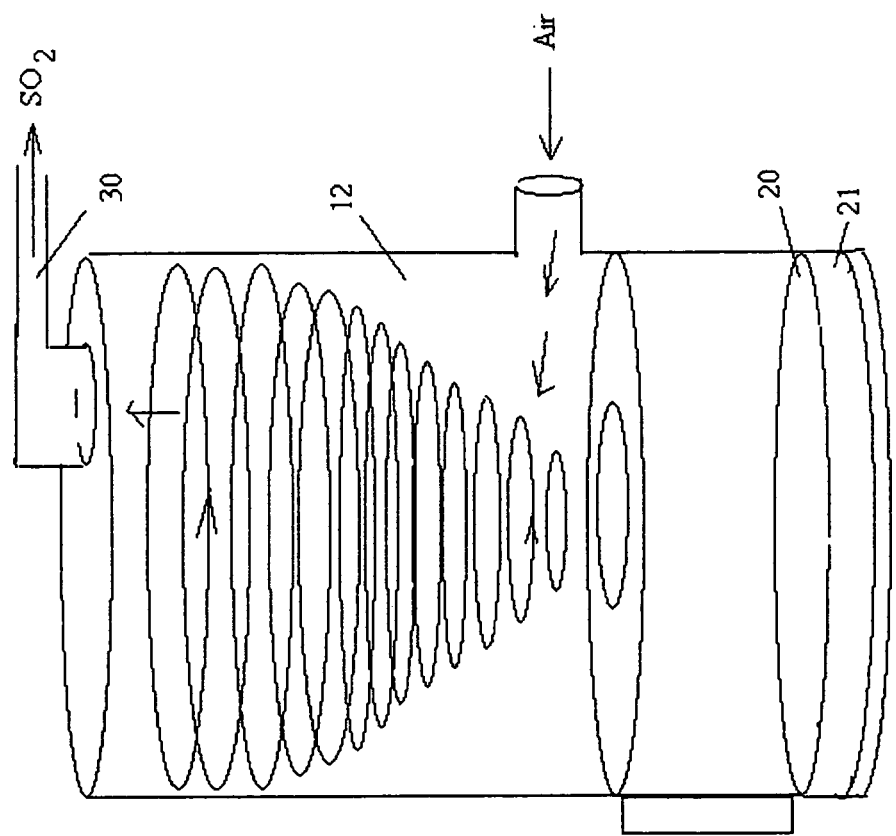
FIG. 4 is a perspective view of the sulfur-burn chamber.
Figure 6:
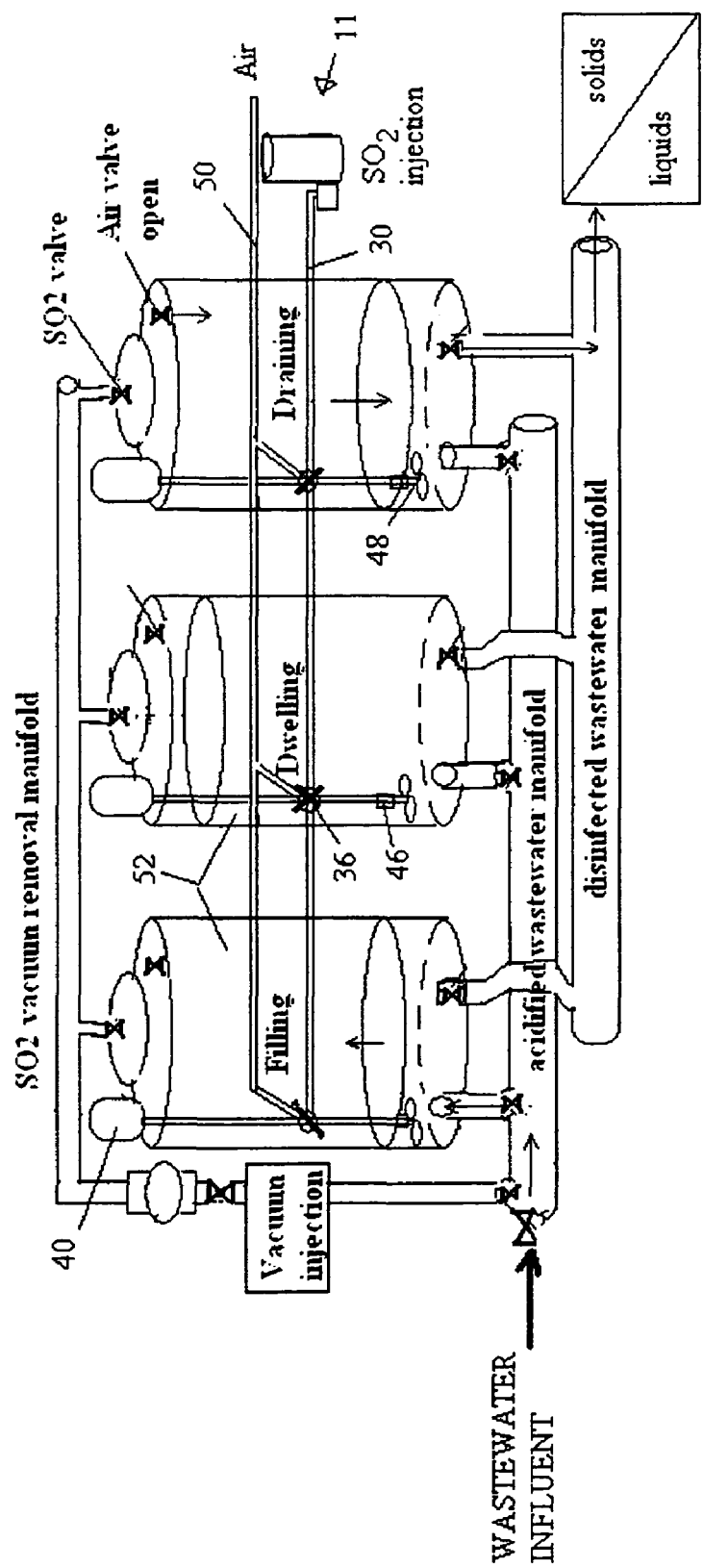
FIG. 6 is a perspective view of a plurality of sulfur dioxide generator with aqueous gas mixers and aerators used for disinfecting and conditioning wastewater.
Figure 7:
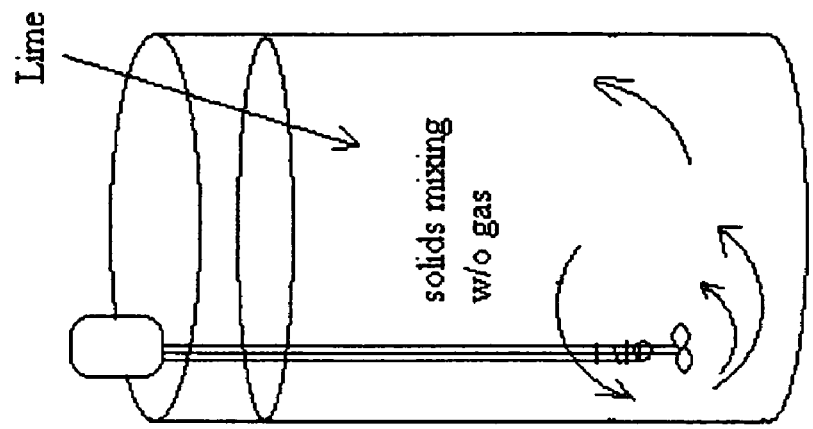
FIG. 7 is a perspective view of the sulfur dioxide generator with aqueous gas mixer and aerator acidifying water standing in a tank.
Figure 8:
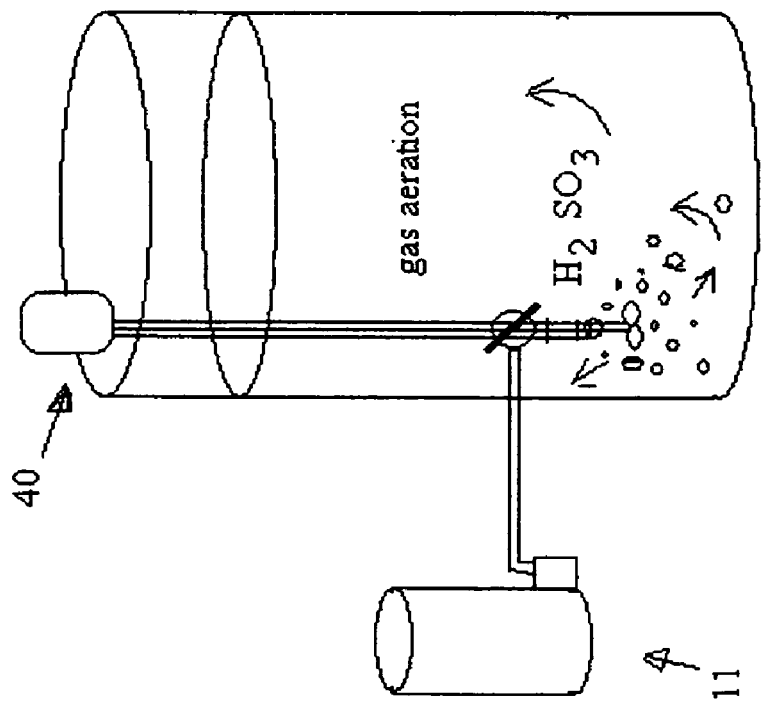
FIG. 8 is a perspective view of the sulfur dioxide generator with aqueous gas mixer and aerator mixing lime added to water standing in a tank without gas addition.
Figure 9:
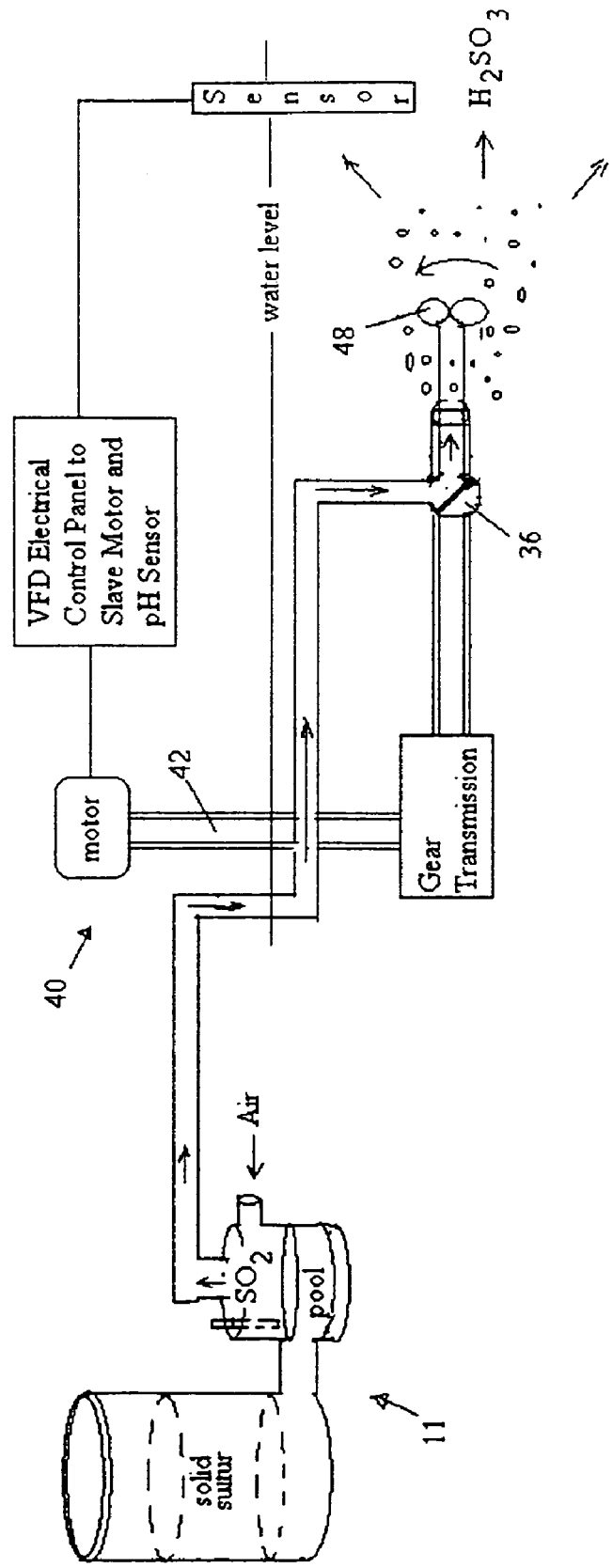
FIG. 9 is a perspective view of the invention of FIGS. 1, 2, and 3 adapted with a bent shaft and gear transmission.

The present invention comprises a sulfur dioxide generator 11 with aqueous gas mixer and aerator 10 as shown in FIG. 1. It comprises a sulfur Hopper 12 with a removably covered fill port 14 and an outlet 16 structured to hold a supply of solid sulfur and direct it through the sulfur hopper outlet 16. The sulfur hopper outlet 16 is connected to a cyclonic sulfur-burn chamber 18 with a bottom 20 adapted to hold a pool of molten sulfur therein within its bottom 20. To seal the bottom 20, a circular cooling ring and plate 21 shown in FIGS. 4 and 5 is affixed to the bottom as a cleanout to remove periodically any buildup of impurities in the burned sulfur from the sulfur-burn chamber 12.

The sulfur-burn chamber 18 has a sulfur inlet 22 operably associated with the sulfur hopper outlet 16 at a first lower elevation. A tangential air inlet 24 structured to allow ambient air containing oxygen is in communication with the interior of the sulfur-burn chamber at a second, relatively higher elevation than the sulfur inlet 22 to inject air in a cyclonic motion above the pool of molten sulfur to produce sulfur dioxide gas. A sulfur dioxide gas outlet 26 at a third relatively higher elevation than the tangential air inlet 24 exhausts sulfur dioxide produced in the sulfur-burn chamber 18. The sulfur-burn chamber 18 is structured so that as more air enters the tangential air inlet 24, the burn rate of sulfur increases to melt more sulfur as cyclonic sulfur dioxide gases rotate faster above the pool of molten sulfur affecting the meniscus level of the pool of molten sulfur as shown in FIGS. 4 and 5 such that the molten sulfur climbs the sidewalls of the sulfur-burn chamber 18 exposing more molten sulfur surface area to generate more sulfur dioxide.

The sulfur hopper outlet 16 is positioned so that the heat of the burning sulfur melts the solid sulfur in a lower segment of the sulfur hopper 12 to insure that molten sulfur is continuously provided to the sulfur pool. Usually a short conduit 17 connects the sulfur hopper outlet 16 to the sulfur-burn chamber inlet 22 to prevent too much heat from the sulfur burn chamber 18 from being transmitted to the sulfur hopper 12 causing melting of the entire contents of the sulfur hopper 12. The sulfur hopper outlet 16 and short conduit 17 have a cross-sectional area sufficient to allow enough sulfur to pass into the sulfur-burn chamber from the feed tank at sufficient flow to sustain the maximum burn rate, but sized to provide sufficient sulfur flow resistance to prevent unmelted sulfur from filling the burn chamber.

An igniter 28 is positioned to contact the sulfur within the sulfur-burn chamber 18 to ignite and start an exothermic sulfur combustion reaction within the sulfur-burn chamber 18 to produce sulfur dioxide gas. The igniter 28 shown is an electronic ignition device, such as an electric heating wand.

A sulfur dioxide gas conduit 30 with an inlet 32 is associated with the sulfur-burn chamber sulfur dioxide gas outlet 26. The sulfur dioxide gas conduit 30 has an outlet 34 to transport the sulfur dioxide from the sulfur-burn chamber.

A valve 36 is associated with the sulfur dioxide gas conduit outlet 34 to selectively allow sulfur dioxide to pass there through in one mode, allow oxygen from the air to pass through in a second mode shown in FIG. 1 for aeration, and a shut-off position to prevent gases from passing in a third mode when the propeller is only used for mixing and circulation.

The valve 36 is operably associated with the gas delivery channel 38 of a combination aerator/mixer 40 with a drive motor 41 attached to a drive shaft 42, such as that produced by Aeration Industries under the tradename AIRE-O2 TRI-TON™. The drive shaft 42 shown is rotatably mounted to turn within the surrounding gas channel 38 having a gas outlet 46 to pass through an aerator 46 to produce fine gas bubble atomization in water.

A propeller 48 is mounted to the shaft 42 beyond the aerator 46 to mix and stir water when the aerator 46 and propeller 48 are positioned within water to be treated with gases. The aerator 46, when the gas valve is open, injects a volume of fine gas bubbles into the water in response to drops in pressure (Bernoulli effect) caused by rotation of the propeller creating reduced pressure within the gas channel 38, sulfur dioxide gas conduit 30, and sulfur burn chamber 18 to vary the amount of oxygen entering the burn chamber to produce differing amounts of sulfur dioxide for injection. Preferably, the motor 41 is a variable speed motor that can increase the rate of rotation of the propeller 48 as needed to drop the pressure near the aerator 46 to draw in more gas for diffusion into the water for treatment. In one preferred embodiment, the aerator 48 draws in 30 cfm to 600-700 cfm of air through the sulfur-burn chamber 18.

As shown in FIG. 1, the valve 36 is shown rotated to allow air to be drawn into an air inlet 50 operably associated with the valve 34 in response to the pressure drop caused by the rotating propeller 48 to aerate water.

In FIG. 2, the valve 36 is shown rotated to close the air inlet 50 and allow sulfur dioxide from the sulfur dioxide conduit 30 to be drawn into the gas channel 38 in response to the pressure drop caused by the rotating propeller 48 to acidify the water with sulfurous acid.

In FIG. 3, the valve 36 is shown rotated to close both the air inlet 50 and the sulfur dioxide conduit 30 so that no gas enters the water to be mixed and circulated by the action of the rotating propeller 48.

FIG. 4 is a cross-section of the sulfur-burn chamber 12 showing how small amount of air entering the sulfur-burn chamber 12 only melts a small area on top of the sulfur pool upon ignition. As additional air is drawn into the sulfur-burn chamber 12, the heated molten sulfur is affected by the swirling cyclonic sulfur dioxide gases causing the sulfur eventually to rise along the sides of the sulfur-burn chamber forming a negative meniscus as shown in FIG. 5. This increased surface area of the sulfur pool provides expanded capacity of the invention 10 to produce significantly more sulfur dioxide as needed. The more negative pressure created by the rotating propeller 48, the more air is drawn into the sulfur-burn chamber 12 causing more sulfur dioxide to be produced and injected into water. The pH of the water can therefore be increased by increasing the rotation of the propeller 48.

FIG. 6 is a perspective view of a sulfur dioxide generator 11 with its sulfur dioxide conduit 30 operably with three aqueous gas mixers and aerators 40 inserted in three enclosed sequential batch tanks 52 for disinfecting and conditioning wastewater. The sulfur dioxide conduit 30 and the air inlet 50 shown as an interconnecting air conduit are each associated with three valves 36, which sequentially deliver air for aeration, and sulfur dioxide for disinfection and chemically dewatering of solids contained in the wastewater pursuant to various wastewater treatment system requirements as shown in FIG. 7. The propeller 48 alone may be used to mix other solids required for treatment, such as lime or other alkaline agents to raise pH or precipitate heavy metals contained in the wastewater as shown in FIG. 8.

The sulfur dioxide generator with aqueous gas mixer and aerator 10 may be used in either enclosed vessels as shown in FIG. 6, or for treating open waters. It thus provides a device which has more versatility and provides more concentrated gases per volume for rapid water treatment than conventional sulfur dioxide generators. It further can be modified for use in shallow ditches and canals, when adapted with a bent shaft 42 and gear transmission as shown in FIG. 9. The motor 41 and a pH sensor are controlled by a VFD Electrical Control Panel to provide the amount of sulfurous acid required.

The fine bubble aeration and mixing increases the effectiveness of the gases through better contact, while reducing the production of aerosols. It also provides better automation control of gas injections by simple variation of the speed of the propeller 48 in response to sensors in the water.

Because of the action of the propeller 48, the entire system, including the sulfur-burn chamber 18 and sulfur dioxide conduit 30 is under negative pressure. All sulfur dioxide gas produced is therefore drawn into the water to produce sulfurous acid; thereby preventing leakage to the atmosphere.

Although the present invention has made reference to the illustrated embodiments, it is not intended to restrict the scope of the appended claims. The claims themselves recite those limitations deemed necessary for the invention.

We claim:

1. A sulfur dioxide generator with aqueous gas mixer and aerator comprising:

a. a sulfur hopper with a fill port and an outlet structured to hold a supply of solid sulfur and direct it through the sulfur hopper outlet, b. a cyclonic sulfur-burn chamber enclosure with a bottom adapted to hold a pool of molten sulfur therein within its bottom having i. a sulfur inlet operably associated with the sulfur hopper outlet at a first lower elevation, ii. a tangential air inlet containing oxygen at a second, relatively higher elevation than the sulfur inlet to inject air in a cyclonic motion above the pool of molten sulfur to produce sulfur dioxide gas, and iii. a sulfur dioxide gas outlet at a third relatively higher elevation than the tangential air inlet to exhaust sulfur dioxide produced in the sulfur-burn chamber;

the sulfur-burn chamber structured i. so that as more air enters the tangential air inlet, the burn rate of sulfur increases to melt more sulfur as cyclonic sulfur dioxide gases rotate faster above the pool of molten sulfur affecting the meniscus level of the pool of molten sulfur such that sulfur climbs the sidewalls of the sulfur-burn chamber exposing more molten sulfur surface area to generate more sulfur dioxide; and ii. the sulfur hopper outlet is positioned so that the heat of the burning sulfur melts the solid sulfur in a lower segment of the sulfur hopper to insure that molten sulfur is continuously provided to the sulfur pool with a cross-sectional area sufficient to allow enough sulfur to pass into the sulfur-burn chamber from the feed tank at sufficient flow to sustain the maximum burn rate, but sized to provide sufficient sulfur flow resistance to prevent unmelted sulfur from filling the burn chamber;
c. an igniter positioned to contact the sulfur within the sulfur-burn chamber to ignite and start an exothermic sulfur combustion reaction within the sulfur-burn chamber to produce sulfur dioxide gas,
d. a sulfur dioxide gas conduit with an inlet associated with the sulfur-burn chamber sulfur dioxide gas outlet and an outlet to transport the sulfur dioxide from the sulfur-burn chamber,
e. a gas valve associated with the sulfur dioxide gas conduit outlet to selectively allow gases to pass there through in a first mode, and a shut-off position to prevent gases from passing in a second mode when the propeller is only used for mixing and circulation; and
f. a combination aerator/mixer with
  i. a drive motor,
  ii. a shaft associated with the drive motor, having at least one gas channel with a gas outlet in communication with the gas valve to allow gas to pass through the gas channel and out the gas outlet,
  iii. an aerator associated with the gas outlet to produce fine gas bubble aeration in water,
  iv. a propeller mounted to the shaft beyond the aerator to mix and stir water when the aerator and propeller are positioned within waters to be treated with gases; the aerator, when the gas valve is open, injecting a volume of fine gas bubbles into the water in response to drops in pressure (Bernoulli effect) caused by rotation of the propeller creating reduced pressure within the gas channel, sulfur dioxide gas conduit, and sulfur burn chamber.

2. A sulfur dioxide generator with aqueous gas mixer and aerator according to claim 1, wherein the motor is a variable speed motor, which rotates the propeller at different speeds to create differing negative pressures near the aerator.

3. A sulfur dioxide generator with aqueous gas mixer and aerator according to claim 2, including a controller associated with the variable speed motor, gas valve, and igniter to variably control the amount of air drawn through the tangential air inlet; thereby controlling the amount of oxygen-containing air entering the sulfur-burn chamber to vary the amount of sulfur dioxide produced in response to a water pH measurement.

4. A sulfur dioxide generator with aqueous gas mixer and aerator according to claim 1, wherein the gas valve is multi-channeled, with each channel associated with different gas sources in addition to sulfur dioxide.

5. A sulfur dioxide generator with aqueous gas mixer and aerator according to claim 4, wherein the channels of the gas valve are associated with oxygen (ambient air), and chlorine for admixing into water for various treatments.

6. A sulfur dioxide generator with aqueous gas mixer and aerator according to claim 4, including a controller associated with the variable speed motor, the multi-channeled gas valve, and igniter to sequentially and variably control the amount of air drawn through the tangential air inlet; thereby controlling the amount of oxygen-containing air entering the sulfur-burn chambers to vary the amount of sulfur dioxide produced and admixed with water in response to a water pH measurement in an acidification mode; the amount of air admixed with water in an aeration mode, and the amount of mixing and circulation of water in a mixing mode.

7. A sulfur dioxide generator with aqueous gas mixer and aerator according to claim 4, wherein the multi-channeled gas valve has a channel associated with a supply of chlorine, and chlorine is admixed with water in a chlorination mode.

8. A sulfur dioxide generator with aqueous gas mixer and aerator according to claim 6, wherein the water to be treated is wastewater including dissolved and suspended solids, which is first aerated for oxidation of pharmaceuticals and other chemicals and virus kill; second treated with sulfur dioxide for acidification and reduction of pharmaceuticals, oxygen and other chemicals, pathogen kill, and chemically treating solids to chemically dewater; and third mixed with an alkaline agent for precipitation and removal of heavy metals.

9. A sulfur dioxide generator with aqueous gas mixer and aerator according to claim 1, wherein the igniter comprises an electrically activated heating wand, a Bunsen burner, or propane torch.

10. A sulfur dioxide generator with aqueous gas mixer and aerator according to claim 1, including a sulfur ash cleanout assembly associated with the bottom of the sulfur-burn chamber.

11. A sulfur dioxide generator with aqueous gas mixer and aerator according to claim 1, wherein the tangential air inlet is substantially diametrically opposite the sulfur hopper.

12. A sulfur dioxide generator with aqueous gas mixer and aerator according to claim 1, including blower means associated with the sulfur-burn chamber inlet to provide additional air and assist in igniting the sulfur.

13. A sulfur dioxide generator with aqueous gas mixer and aerator according to claim 1, wherein the shaft is bent at right angles operably associated with a gear transmission to position the propeller proximate the bottom of open canals and ditches to selectively introduce sulfur dioxide in fine bubbles into an open water stream to form sulfurous acid.

14. A sulfur dioxide generator with aqueous gas mixer and aerator according to claim 1, including sensors placed in the water to be aerated with gases, and a control panel operably associated with the sensors and motor to control the speed to the propeller to draw in the amount of gases to maintain a desired gas content and pH.

* * * * *